United States Patent [19]

Barnett

[11] Patent Number: 4,707,009
[45] Date of Patent: Nov. 17, 1987

[54] AUTOMOBILE SIDE PROTECTOR

[76] Inventor: John L. Barnett, 23812 Country View Dr., Diamond Bar, Calif. 91765

[21] Appl. No.: 946,853

[22] Filed: Dec. 29, 1986

[51] Int. Cl.$^4$ .............................................. B60R 19/02
[52] U.S. Cl. ..................................... 293/128; 280/770
[58] Field of Search ........................ 293/128; 296/136; 280/770

[56] References Cited

U.S. PATENT DOCUMENTS

| | | | |
|---|---|---|---|
| 3,610,669 | 10/1971 | Morrissey | 293/128 |
| 3,738,695 | 6/1973 | McBee | 293/128 |
| 4,561,685 | 12/1985 | Fisher | 293/128 |
| 4,639,027 | 1/1987 | Boyd | 280/770 |
| 4,643,471 | 2/1987 | Fishback | 293/128 |

*Primary Examiner*—Robert R. Song
*Attorney, Agent, or Firm*—Edgar W. Averill, Jr.

[57] ABSTRACT

An automobile side protector for guarding both sides of an automobile against dents and scratches from adjacent automobile doors and other sources. The protector has a saddle band of sufficient length to pass over the top of an automobile. A pair of tabs extend inwardly from the saddle band and can be captured by the doors or windows of the automobile to be protected. Support bands extending downwardly from the saddle band hold one or more protective pads which extend along each side of the automobile.

7 Claims, 7 Drawing Figures

U.S. Patent   Nov. 17, 1987   4,707,009
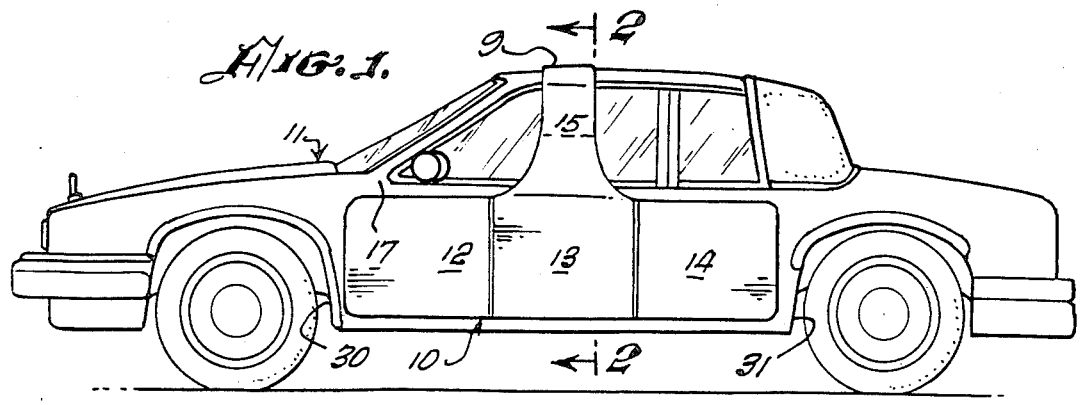
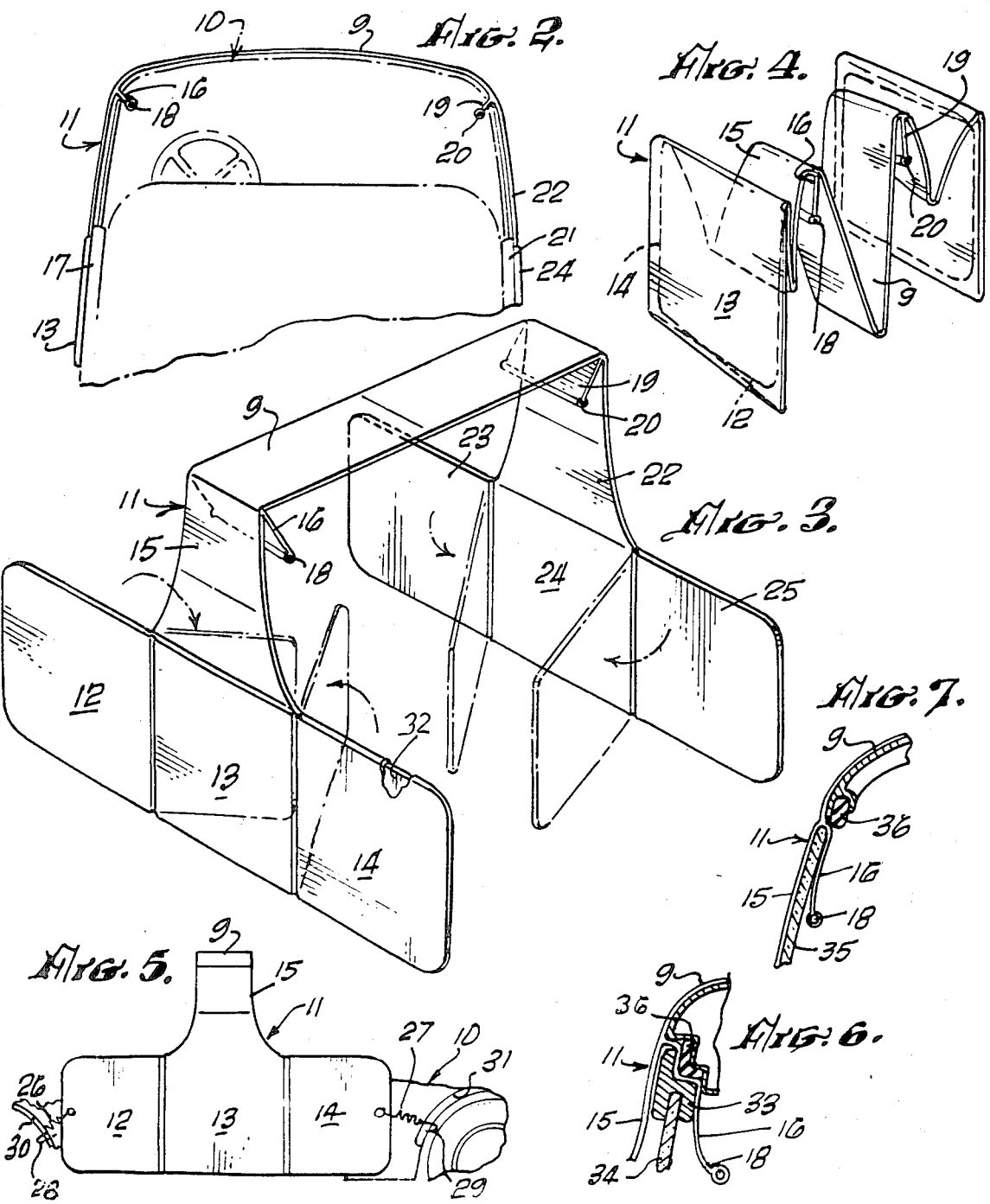

AUTOMOBILE SIDE PROTECTOR

BACKGROUND OF THE INVENTION

The field of the invention is automotive parts and the invention relates more particularly to devices for protecting the sides of automobiles against dents and scratches of the type typically occurring in parking lots.

Numerous approaches have been taken to protect automotive sides. One such device is shown in U.S. Pat. No. 4,014,583 where a pair of straps are hooked to the automobile window and hold a protective pad against the side of an automobile by magnets or other means. Because the device is held along only one side, an uneven force is exerted and a significant amount of weight must be supported by the automobile window. A car body guard is shown in U.S. Pat. No. 4,493,502 which utilizes a flexible strap which is retracted into a holder held in the automobile wheel well. A strap, however, protects only a small portion of the automobile side. An upwardly extendable pad is shown in U.S. Pat. No. 3,563,594 and the pad is rolled upwardly from a holder held under the rocker panel of the car. This device, however, would appear to detract from the appearance of the automobile since it visibly extends below the rocker panel. Also, it is exposed to mud, water and other elements which could tend to scratch the side of the automobile once the pad was unrolled. Another retractable protector is shown in U.S. Pat. No. 3,540,773 where the shield is unfolded from the center gap between the front and back door of the vehicle. This device would appear usable only with a very limited design of four-door automobiles. A pad supported by the vehicle door lock is shown in U.S. Pat. No. 3,704,037 but it appears to provide very limited protection. A vehicle car door protection system is also shown in U.S. Pat. No. 4,530,519 and the device is unrolled upwardly from a holder held below the automobile door. It would appear that the device would have to be added at the factory or otherwise inserted below the surface of the rocker panel. Plastic pads to protect the side of pickup trucks is shown in U.S. Pat. No. 4,531,560 and the pads are held to the vehicle by magnets. The approach would appear impractical, however, for protecting car door sides in parking lots since it could be readily removed by anyone and, thus, becomes an easy target for theft.

There is, thus, a need for a protector which protects both sides of a vehicle, can be securely held to the vehicle when the vehicle is locked and which can be readily applied and easily folded when not in use.

SUMMARY OF THE INVENTION

The present invention is for an automobile side protector for guarding both sides of an automobile against dents and scratches from adjacent automobile doors. The protector has a saddle band of sufficient length to pass over the top of an automobile. Right and left tabs are affixed to the saddle band and the pads are grippable by the doors or windows of the automobile and, thus, can be held by the doors or windows when the automobile is locked. Each of the tabs has dowel means so that they may not be readily pulled out from under the door or window which holds them. Right and left downwardly extending support bands are affixed to the saddle band at the point of attachment of the tabs. Each of the support bands holds at least one protective pad so that the pads extend downwardly a sufficient distance to extend about to the rocker panel of the automobile. In this way, the entire side of the automobile between the wheel wells may be protected, this area being the major area of scratches and dents. The pads may also be provided with elastic bands which permits them to be hooked under the wheel wells of the automobile to prevent movement in the wind. The method of affixing the pads to the automobile is also a portion of the present invention and this is carried out by placing the pad on the top of the automobile and closing each door against the tabs and then extending each pad downwardly along each side of the automobile.

BRIEF DESCRIPTION OF THE DRAWINGS

FIG. 1 is a side view of an automobile including the protective pad of the present invention.

FIG. 2 is a cross-sectional view taken along line 2—2 of FIG. 1.

FIG. 3 is an enlarged perspective view of the protective pad of the present invention.

FIG. 4 is a reduced perspective view of the pad of FIG. 3 in a folded configuration.

FIG. 5 is a side view of an alternate configuration of the pad of the present invention including elastic cord means for hooking under the wheel wells of the vehicle to be protected.

FIG. 6 is an enlarged view of the top of a vehicle door with one of the tabs of the protective pad of the present invention held therein.

FIG. 7 is an enlarged cross-sectional view of the top of a vehicle window holding the tab of the protective pad of the present invention.

DESCRIPTION OF THE PREFERRED EMBODIMENTS

The protective pad 10 of the present invention is shown placed over the top of an automobile 11. Protective pad 10 has a forwardly extending pad 12, a center pad 13 and a rearwardly extending pad 14. Pads 12, 13 and 14 are held by a downwardly extending support band 15 which, in turn, is held by a saddle band 16 which extends over the automobile as shown most clearly in FIG. 2. A left tab 16 is captured by the left door 17 of automobile 11. Left tab 16 also has a dowel 18 sewn therein which prevents the pulling of left tab 16 from a captured position within the door 17. Similarly, a right tab 19 has a dowel 20 which is captured by the right door 21 at the top thereof. A downwardly extending support band 22 holds forwardly extending pad 23, center pad 24 and rearwardly extending pad 25.

As shown in FIG. 5, a pair of elastic bands 26 and 27 having hooks 28 and 29 may be held by hooking them under wheel wells 30 and 31. Alternatively, the hooks 28 and 29 can be attached under the rocker panels of automobile 11.

The protective pad of the present invention may be fabricated from nylon or other weather resistant and strong fabric or plastic sheet. The dowels may merely be sewn in a fold of the canvas and may be wooden dowels or merely a thickened, folded portion of the fabric or plastic sheeting from which the pad is made. Although the pad could be fabricated from a relatively thick material which in itself may provide protection, it is contemplated that sponge or fiber pads be sewn in pockets of the sides of the pad of the present invention. Such a pad is shown in FIG. 3 and indicated by reference character 32.

There are two basic types of door constructions, one of which being shown in FIG. 6 of the drawings and the other being shown in FIG. 7. In FIG. 6, the front door window is surrounded by a metal frame 33 which surrounds window 34. The tab 16 is thus captured between metal frame 33 and the body gasket 36'. An alternate construction is shown in FIG. 7 where the automobile window 35 closes against a gasket 36 affixed to the body of the automobile. In this way, the tab 16 is held between window 35 and gasket 36 and the dowel 18 cannot be pulled out from between the window and gasket without opening the door of the automobile.

The design of pad of the present invention also permits the ready folding thereof so that it may be stored behind one of the seats of the automobile. In FIG. 4, it can be seen that pad 14 is folded forwardly, pad 12 is folded rearwardly, pad 25 is folded in a forward direction and pad 23 is folded rearwardly. The saddle band 9 is folded downwardly within the pads and the entire folded assembly is not significantly larger than any one of the pads.

The method of applying the pad of the present invention comprises the steps of placing the entire protective pad assembly on the top of the automobile with the tabs thereof extending inwardly or downwardly. One of the doors of the automobile is opened and the tab is placed so that it hangs over the edge of the door opening. The door is then closed against the tab with the dowel thereof within the automobile. The user then goes around to the other side of the automobile and opens the other door and places the second tab downwardly over the door opening. The door is then closed against the second tab and the protective pads are unfolded and allowed to hang downwardly along each side of the vehicle. Preferably, the car doors are locked so that the pad cannot be removed without unlocking the opening the doors. In the case where the pad further includes elastic cords, the steps would, of course, include a step of hooking the hooks in the elastic cords under the wheel wells of the automobile. The elastic cords prevent the pad from being blown in the wind.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An automobile side protector for guarding both sides of an automobile against dents and scratches from adjacent automobile doors and other sources, said protector comprising:
    a saddle band of sufficient length to pass over the top of an automobile;
    right and left tabs affixed to said saddle band and said tabs being grippable by the door or window of the automobile to be protected, each of said tabs having dowel means positioned away from their line of attachment to the saddle band;
    right and left downwardly extending support bands affixed to the saddle band at the point of attachment of the tabs; and
    each of said support bands holding at least one protective pad so that the pads extend downwardly a sufficient distance to extend about to the rocker panel of the automobile to be protected and each of said at least one protective pads extending forwardly and rearwardly away from said support bands.

2. The automobile side protector of claim 1 wherein each support band holds a forward protective pad and a rearward protective pad.

3. The automobile side protector of claim 2 wherein the protector is a readily foldable protector, and wherein each support band is about two feet wide at their lowermost point, and each pad is about two feet wide so that each forward pad may be folded rearwardly and each rearward pad may be folded forwardly and the saddle band may be folded between the right and left pad assemblies to provide a folded configuration of minimal size.

4. The automobile side protector of claim 1 further including elastic cord means affixed to the forwardmost and rearwardmost edges of the right and left pads and each of said elastic cords having hook means whereby the pads may be attached to the wheel wells of any automobile over which the pads are placed.

5. The automobile side protector of claim 1 wherein the saddle band is about one foot in width and the downwardly extending support pads have a width of about one foot at the tops thereof and extend outwardly to about two feet at the line at which they attach to the protective pads.

6. A method of protecting the sides of an automobile with a protective pad assembly having a saddle band, two tabs, each connected to an end of the saddle band and having dowel means and two pad assemblies held to the saddle band by a support band, said method comprising:
    placing the entire protective pad assembly on the top of the automobile to be protected with the tabs extending inwardly;
    opening one of the doors of the automobile and inserting one of the tabs over the edge of the opening so that the dowel means thereof extends below the door opening;
    closing the door which is open against the tab whereby the dowel means of the tab is captured by the edge of the door or window;
    opening the opposing door on the opposite side of the automobile, as the first door opened, and inserting the other of the tabs over the edge of the opening so that the dowel means thereof extends below the door opening;
    closing the door which is open against the tab whereby the dowel means of the tab is captured by the edge of the door or window;
    unfolding one of the pad assemblies and allowing it to hang downwardly along one side of the vehicle; and
    unfolding the other of the pad assemblies and allowing it to hang downwardly along the other side of the vehicle.

7. The method of claim 6 further including the steps of hooking the end of the elastic cords attached to the protective pad in the wheel wells of the automobile to be protected.

* * * * *